United States Patent [19]

Seki

[11] Patent Number: 5,715,935
[45] Date of Patent: Feb. 10, 1998

[54] PACKAGING KIT FOR RECORDING MEDIUM

[75] Inventor: Seizo Seki, Miyagi, Japan

[73] Assignee: Sony Corporation, Japan

[21] Appl. No.: 651,598

[22] Filed: May 22, 1996

[30] Foreign Application Priority Data

May 31, 1995 [JP] Japan ............................ 7-156807

[51] Int. Cl.[6] .......................................... B65D 65/00
[52] U.S. Cl. ............................. 206/232; 206/308.3
[58] Field of Search ..................... 206/232, 308.1, 206/308.3, 312, 387.1

[56] References Cited

U.S. PATENT DOCUMENTS

| | | | |
|---|---|---|---|
| 4,125,189 | 11/1978 | Fujimoto et al. | 206/387.1 |
| 4,307,806 | 12/1981 | Haubert | 206/232 |
| 4,322,000 | 3/1982 | Struble | 206/387.1 |
| 4,802,601 | 2/1989 | Pijanowski et al. | 206/387.1 |
| 4,852,739 | 8/1989 | Franco | 206/387.1 |
| 4,867,310 | 9/1989 | Cannon et al. | 206/232 |
| 4,892,189 | 1/1990 | Kunimune et al. | 206/232 |
| 4,998,985 | 3/1991 | Sankey | 206/387.1 |
| 5,103,978 | 4/1992 | Secor | 206/387.1 |
| 5,373,944 | 12/1994 | Ishitsuka | 206/308.3 |
| 5,450,952 | 9/1995 | Funawatari et al. | 206/308.3 |
| 5,510,165 | 4/1996 | Seki | 206/387.1 |
| 5,531,322 | 7/1996 | Iwaki et al. | 206/308.3 |
| 5,531,324 | 7/1996 | Kosaki et al. | 206/308.3 |
| 5,540,328 | 7/1996 | Kohtake | 206/308.3 |

*Primary Examiner*—Paul T. Sewell
*Assistant Examiner*—Nhan T. Lam
*Attorney, Agent, or Firm*—Ronald P. Kananen

[57] ABSTRACT

A packaging kit for simultaneously packaging a casing holding a recording medium configured for recording information signals and a main card arranged for sheathing the casing and which is used as an accessory index card having indications of, for example, titles representing the recording contents of the recording medium. The main card employed for the packaging kit has printed indications of the titles showing the recording contents on its one surface and also has a subsidiary card releasably bonded to its opposite surface. The subsidiary card is coated with an adhesive to form an adhesive layer. The opposite surface of the main card, to which is bonded the subsidiary card, has been processed for releasing to permit easy release of the subsidiary card having the adhesive layer. The main card is formed of a paper material having the basis weight of 170 to 210 g/m$^2$, while the subsidiary card is formed of a paper material having the basis weight of 60 to 100 g/m$^2$. By layering the main card and the subsidiary card, saving in the material and reduction in the number of component parts of the packaging kit may be achieved, while the main card may be improved in strength.

2 Claims, 12 Drawing Sheets

PACKAGING KIT FOR RECORDING MEDIUM

FIELD OF THE INVENTION

This invention relates to a packaging device or kit for packaging a tape cartridge or a disc cartridge used as an information signal recording medium. More particularly, it relates to a packaging kit for holding a tape cartridge or a disc cartridge in a holding casing and for packaging, along with the holding casing, an index card stating the recording contents of the disc cartridge or the tape cartridge.

DESCRIPTION OF THE RELATED ART

Up to now, a casing 401 for holding a disc cartridge, comprised of a cartridge main member and a disc, such as a magnetic disc or an optical disc housed therein, as shown in FIG. 1, has been in use.

The casing 401 shown in FIG. 1 is formed to a rectangular shape conforming to the size of a disc cartridge housed therein by bending and bonding a sheet material formed of synthetic resin, such as polypropylene (PP) or polyethylene terephthalate (PET). The casing 401 has an opening 404 on its narrow lateral side via which the disc cartridge is inserted or taken out.

When placed on the market, the casing 401 housing the disc cartridge is packaged along with an accessory index card 451 which is a main card stating the recording contents in the disc cartridge. The packaging material for packaging the casing and the index card is a so-called overlap film which is a film sheet of a transparent synthetic resin.

The index card 451, annexed to the casing 401 holding the disc cartridge therein and packaged along with the casing 401, has indications for a title or archives of musical numbers recorded on a disc housed in the disc cartridge held in the casing 401, an entry column for recording date and time or contents recorded on the disc, and indications for disc type, disc design statements or disc recording capacity, printed on front and back sides of the index card 451. The index card 451 is sized to cover both major surfaces of the casing 401 and, when packaged along with the casing 401, is bent into a U-shaped cross-section and is inserted via the opening 404 so as to overlie both major surfaces of the casing 401, as shown in FIG. 2. The index card 451 is folded for overlying both sides of the casing 401 so that its portion having the indications of the title or recording contents such as musical numbers recorded on the disc will face to outside.

The packaging device for packaging the index card 451 along with the casing 401 additionally has an accessory card which is bonded to the disc cartridge and on which are entered the recording contents of the disc housed within the cartridge main portion.

An overlap film is a heat contractible film which, after packing the casing, index card and the accessory card therein, is heat-contracted so as to be tightly engaged with the outer surface of the packaged components.

The accessory card, employed in the above-described packaging device, is formed independently of the index card 451. Consequently, the number of component parts of the packaging device is increased, while the packaging operation is complicated. The index card 451 and a label need to be produced by separate production steps, thus complicating the production.

Since the index card and the accessory card are produced separately, the number of packaged component parts is increased, so that, after unpacking, the packaged goods tend to be lost. In particular, the small-sized thin accessory card is most liable to be lost. The accessory card has an adhesive applied to its back surface so as to be bonded to the disc cartridge when needed. When packaging the accessory card, a release sheet is applied to the side of the accessory card carrying the adhesive. Consequently, the release sheet is left as a refuse after application of the accessory card.

The index card 451, arranged for overlying the outer periphery of the casing 401, may be seen through from outside via a transparent overlap film applied thereto for packaging. In order to assure good appearance of the packaged article offered for sale, it is desirable that a title or the like specifying the recording contents indicated on the index card be excellent in design, and that, in addition, the index card itself be immune from inadvertent warping or other injuries.

Since the index card is formed by a cardboard sheet, it is liable to be warped, crushed or otherwise damaged if an impact is applied to the packaging kit through being inadvertently dropped or bumped during display. If the index card is damaged, the packaging kit is deteriorated in appearance.

In addition, since the casing 401 has cut-outs 402, 403 for finger support and for exposing part of the disc cartridge 405 held therein to outside, there is produced a step difference corresponding to a thickness d of the casing 401 in an area of the opening 404. For positively holding the disc cartridge 405 for assuring reliable protection, the casing 401 is sized to be slightly larger than the disc cartridge 405 held therein. Consequently, there is necessarily formed a protrusion having a width S shown in FIG. 4 at an area of the opening 404 of the casing 401 when the disc cartridge 405 is held therein. Thus a portion of the index card 401 mounted for overlying the casing 401 is not supported by the casing 401. If an accidental shock is applied to the packaging device such as through inadvertent descent, the index card 451 overlying the casing 401 is easily deformed along with the overlap film, while the thin overlap film is also destroyed, thus detracting from the appearance of the packaged article.

SUMMARY OF THE INVENTION

It is therefore an object of the present invention to provide a packaging kit with a reduced number of the component parts annexed to the recording medium, such as a disc cartridge or a tape cartridge.

It is another object of the present invention to provide a packaging kit in which accessory cards annexed to and packaged with the recording medium may be fabricated easily.

It is still another object of the present invention to provide a packaging kit in which it is possible to prevent the article packaging from being warped and to keep the optimum packaged state for prolonged time to assure positive protection of the packaged article.

It is yet another object of the present invention to provide a packaging kit with which it is possible to effect packaging with good appearance.

A packaging kit according to the present invention simultaneously packages a casing holding a recording medium configured for recording information signals, such as a disc cartridge or a tape cartridge, and a main card arranged for sheathing the casing and which is used as an accessory index card having indications of, for example, titles representing the recording contents of the recording medium. The main card employed for the packaging kit has printed indications of the titles showing the recording contents on its one surface and also has a subsidiary card releasably bonded to its opposite surface. The subsidiary card is coated with an adhesive to form an adhesive layer. The opposite surface of the main card, to which is bonded the subsidiary card, is processed for releasing to permit easy release of the subsidiary card having the adhesive layer. The main card is formed of a paper material having the basis weight of 170 to 210 g/m$^2$, while the subsidiary card is formed of a paper material having the basis weight of 60 to 100 g/m$^2$.

As a result of out perseverant researches, the present inventors have found that, on particular, the main card preferably is formed of a paper material having the basis weight of 170 to 210 g/m$^2$, while the subsidiary card preferably is formed of a paper material having the basis weight of 60 to 100 g/m$^2$.

The reason of using the paper material having the basis weight of 170 to 210 g/m$^2$ for the main card is that, if the main card is thinner than the thickness corresponding to such basis weight, the recording medium held in the casing cannot be protected sufficiently, whereas, if the main card is thicker than the thickness corresponding to such basis weight, the packaged article obtained on packaging with the overlap film is deteriorated in appearance. In particular, the subsidiary card provided with the adhesive layer is bonded to the main card so as to be superimposed thereon, the main card is preferably formed of the above paper material for preventing the layered assembly composed of the main card and the subsidiary card from being excessively increased in thickness.

On the other hand, the paper material having the basis weight of 60 to 1000 g/m$^2$ is used for the subsidiary card for possibly improving the writing performance with the writing instrument, such as sign pen or ball-point pen, and for preventing the layered assembly composed of the main card and the subsidiary card from being excessively increased in thickness.

Other features and advantages of the present invention will become apparent from the following description of the preferred embodiments and the claims.

DESCRIPTION OF THE PREFERRED EMBODIMENTS

Figure 1:
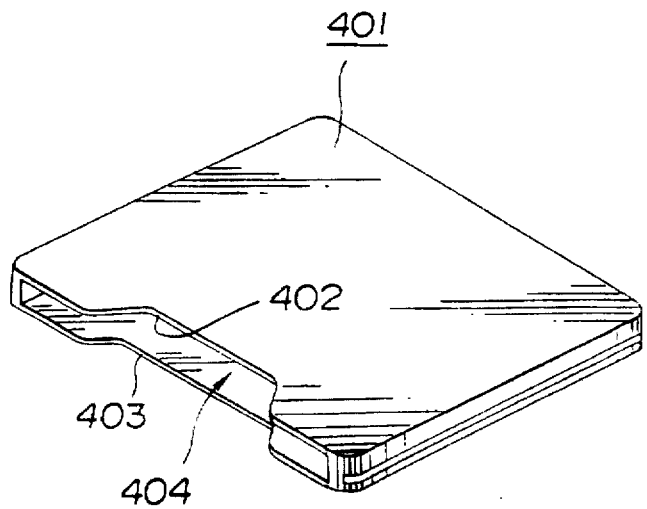
FIG. 1 is a perspective view showing a conventional casing.
Figure 2:
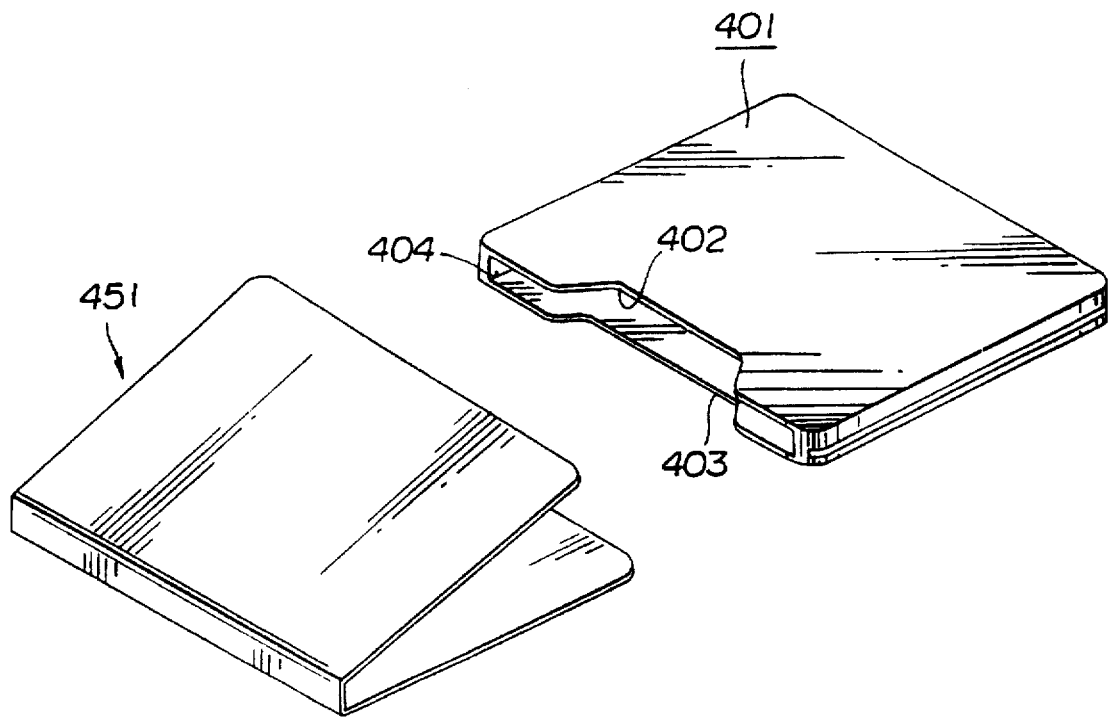
FIG. 2 is a perspective view showing a convectional index card along with a casing.
Figure 3:
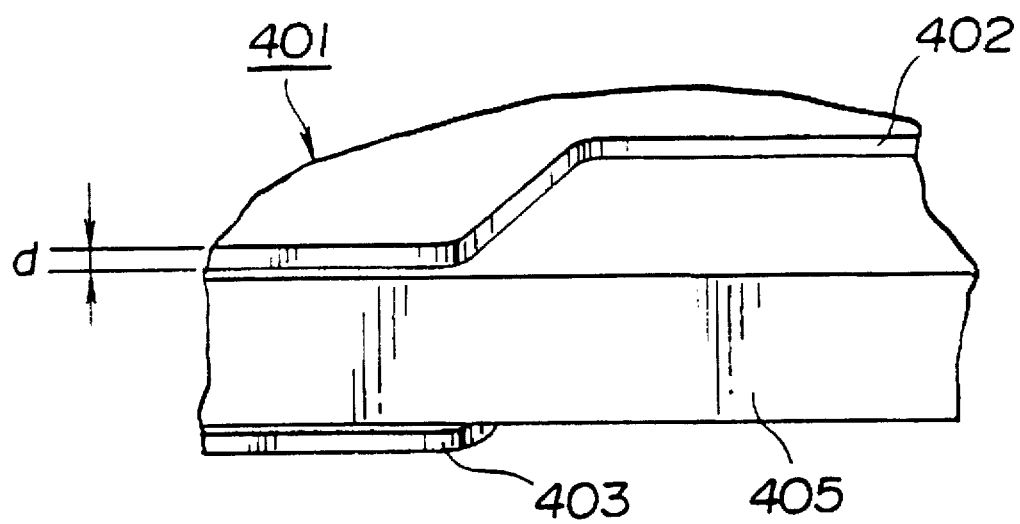
FIG. 3 is a perspective view showing the vicinity of an opening of the conventional casing.
Figure 4:
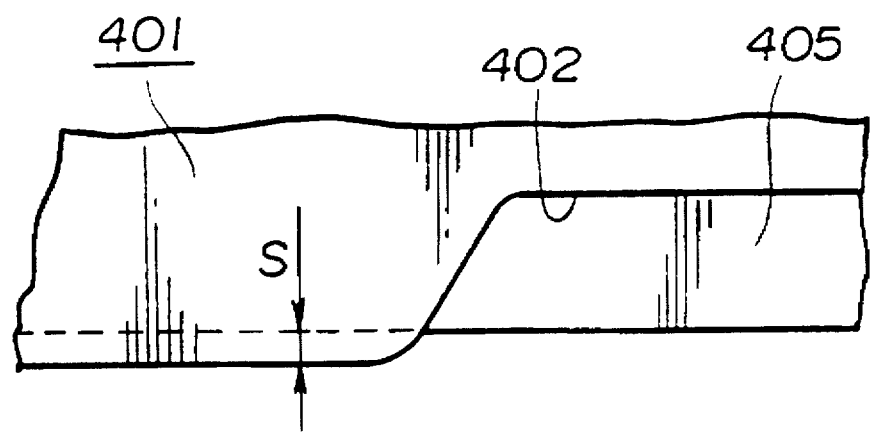
FIG. 4 is a plan view showing the vicinity of an opening of the conventional casing.

Referring to the drawings, illustrative embodiments of a casing device for a recording medium according to the present invention will be explained in detail.

In the following embodiments, the present invention is applied to a packaging kit for packaging a casing holding therein a disc cartridge having enclosed therein a disc-shaped recording medium, such as a disc-shaped recording medium, such as an optical disc, with an overlap film, which is a film sheet of a transparent synthetic resin.

The packaging kit of the present invention is configured for packing a casing 51 and a main card 501 with an overlap film which is a film sheet of a transparent synthetic resin having heat shrinkable properties. The casing 51 has held therein a disc cartridge 101 comprised of an optical disc 117 as a disc-shaped recording medium for recording information signals and a cartridge main member 102 housing the optical disc 117 therein. The main card 501 is used as an index card representing recording contents on the optical disc 117 housed in the disc cartridge 101, and is annexed to the disc cartridge 101 held in the casing 51.

[1] Casing and Disc Cartridge

First, the casing 51 packaged by the packaging kit of the present embodiment and the disc cartridge 101 held within the casing 51 is explained.

Figure 5:
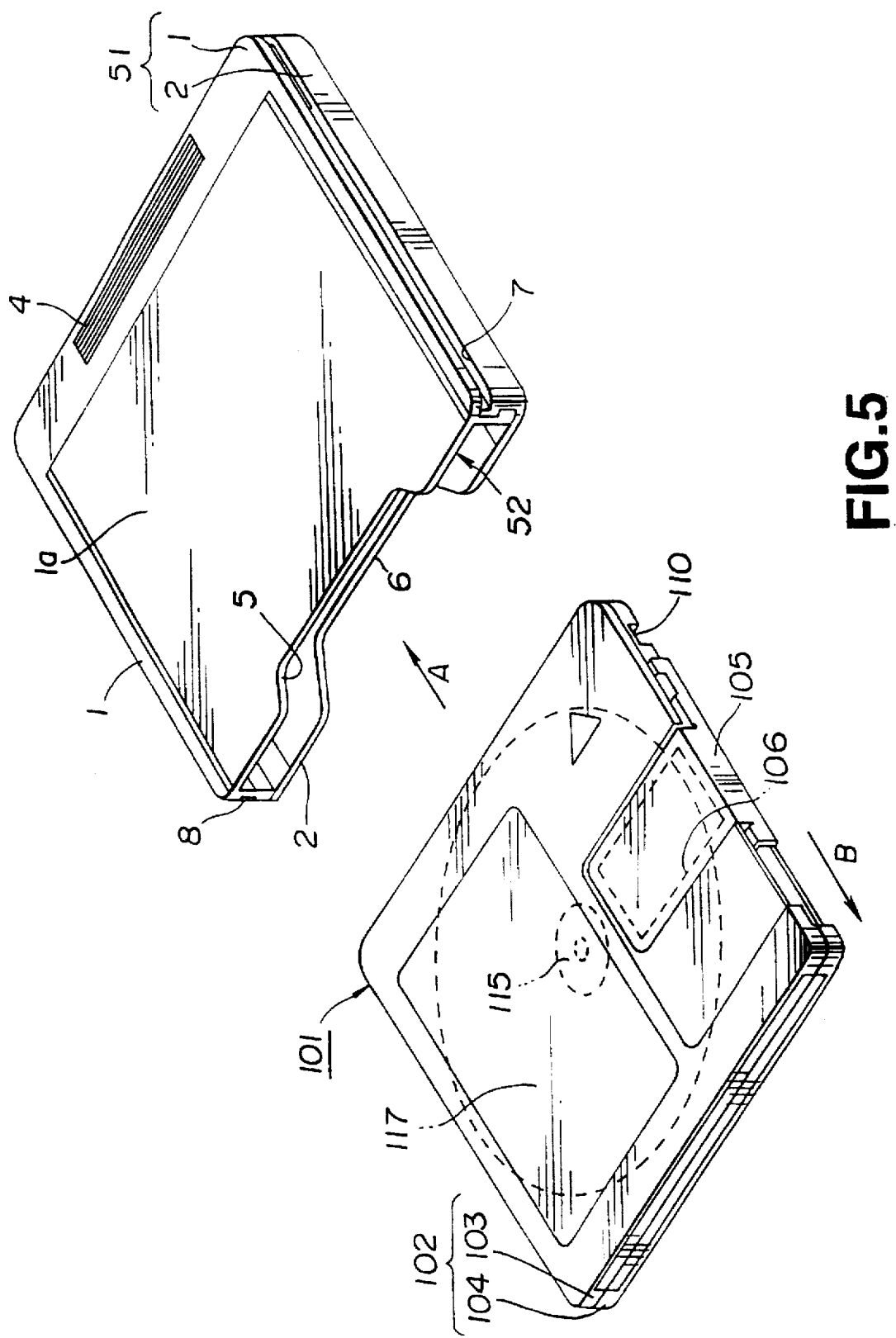
FIG. 5 is a perspective view showing a casing of a packaging kit according to the present invention and a disc cartridge held in the casing.
Figure 6:
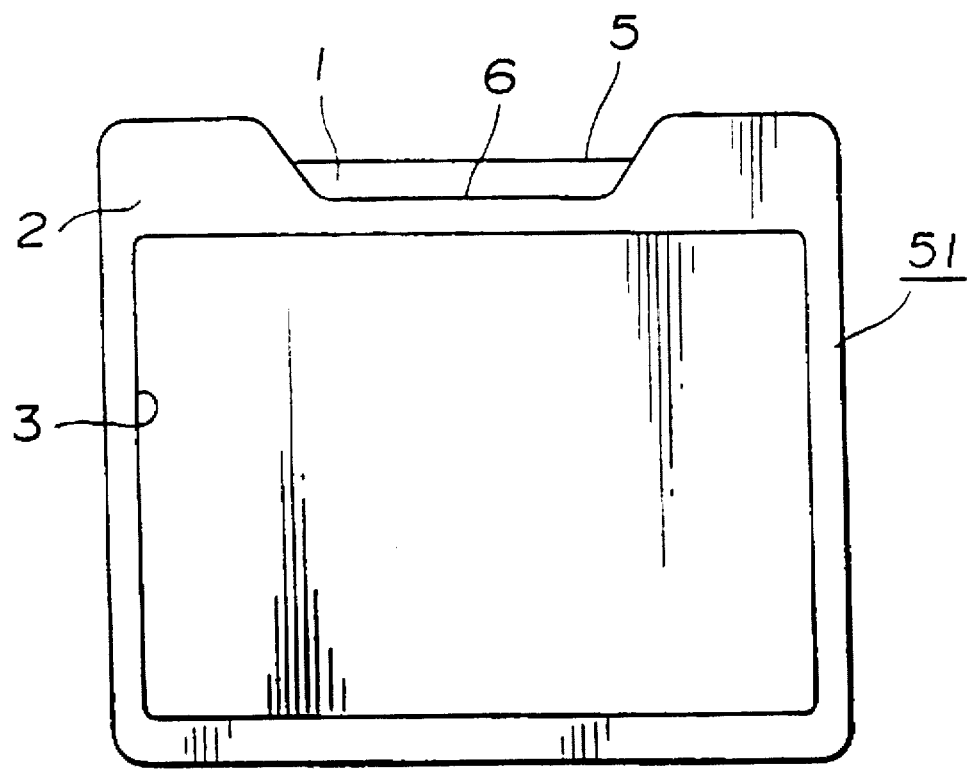
FIG. 6 is a plan view of the casing.

The disc cartridge 101 held within the casing 51 houses the optical disc 117 for rotation in the cartridge main member 102 comprised of upper and lower halves 103, 104 abutted and connected together, as shown in FIG. 5. The optical disc 117 is comprised of a disc substrate formed of a light-transmitting synthetic resin material and a signal recording layer deposited on the major surface of the disc substrate. The optical disc 117 has a center chuck opening engaged by a spindle shaft of a disc rotating driving unit, and a mounting reference portion supported by a disc table of the disc rotating driving unit for surrounding the center chuck opening. On the opposite surface of the optical disc 117 with respect to its surface having the mounting reference portion, there is mounted a chuck plate 115 of a metallic material for closing the chuck opening.

The cartridge main member 102 is formed as a rectangle having a side substantially corresponding to the diameter of the optical disc 117 housed therein. At mid portions in the transverse direction of upper and lower surfaces of the cartridge main member 102, there are formed a pair of rectangular-shaped recording/reproducing apertures 106. The recording/reproducing aperture formed in the lower half 104 exposes a portion of one of the major surfaces of the optical disc 117 to outside across the inner and outer disc rims. The recording/reproducing aperture formed in the upper half 103 exposes a portion of the other major surface of the optical disc 117 to outside across the inner and outer disc rims. These recording/reproducing apertures 106 are opened or closed by a shutter member 105 mounted for sliding movement on the cartridge main member 102. The shutter member 105 is formed by a thin metallic plate and comprised of pair of shutter portions connected at distal sides thereof by a connecting piece, in the cross-sectional shape of a letter U, so that the shutter portions face each other. The shutter member 105 is mounted in a fitting fashion from a lateral side of the cartridge main member 102 so as to be moved between a position closing the apertures 106 and a position opening the apertures 106. The direction of movement of the shutter member 105 for opening or closing the apertures 106 is the same as that for loading and unloading the disc cartridge 101 with respect to the recording/reproducing apparatus. When the disc cartridge 101 is loaded on the recording/reproducing apparatus in a direction indicated by arrow A in FIG. 5, the shutter member 105 is moved by a shutter opening member provided on the recording/reproducing apparatus from the position of closing the apertures 106 in a direction opposite to the loading direction as shown by arrow B in FIG. 5 for opening the recording/reproducing apertures 106. At a mid portion on the lower surface of the cartridge main member 102, there is formed a center opening for exposing the chuck opening, mounting reference surface and the chuck plate 115 of the optical disc 117 to outside. In both lateral sides of the cartridge main member 102 parallel to the side along which slides the shutter member 105, there are formed recesses 110 engaged by loading means configured for loading the disc cartridge on the recording/reproducing apparatus. In the lower surface of the cartridge main member 102, there are bored a discrimination hole for indicating the type of the optical disc 117 housed therein and a positioning hole engaged by a positioning pin configured for setting the loading position of the disc cartridge 101 in position when the disc cartridge is loaded on the recording/reproducing apparatus.

The casing 51, configured for holding the above-described disc cartridge 101, is comprised of an upper half 1 and a lower half 2 of molded synthetic resin abutted and bonded together, as shown in FIGS. 5 to 10.

Figure 10:
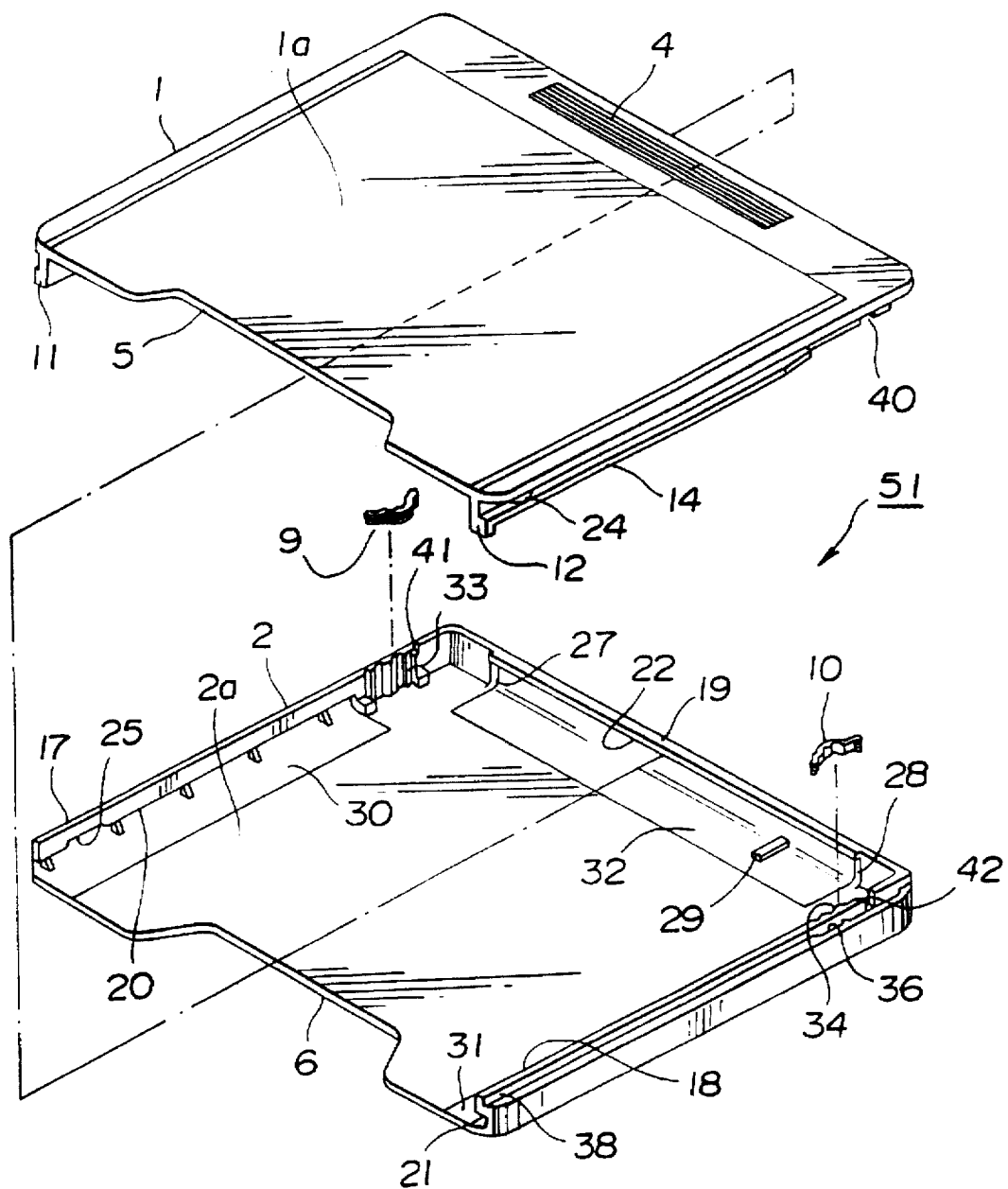
FIG. 10 is an exploded perspective view of the casing.
Figure 11:
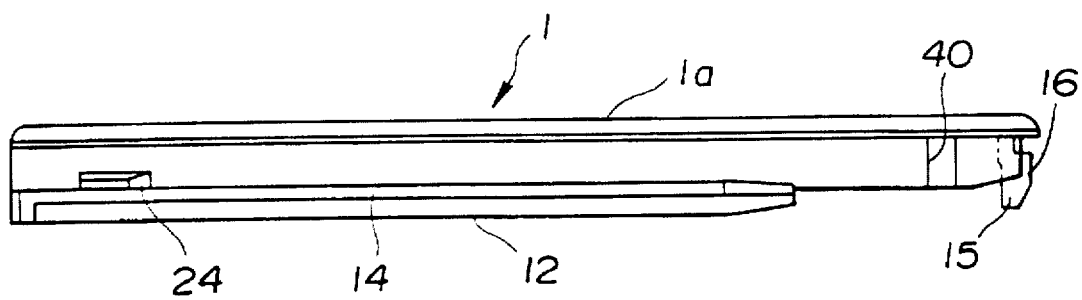
FIG. 11 is a side view showing an upper half of the casing.

The upper half 1 of the casing 51 has a rectangular-shaped top plate 1a sized to conform substantially to the plan profile of the disc cartridge 101 held within the casing 51. On both sides of an inner surface of the top plate 1a abutted against the lower half 2, there are set upright a pair of inner sidewall sections 11, 12 delimiting the lateral sides of the casing 51, as shown in FIGS. 10 and 11. These sidewall sections 11, 12 are formed on the lateral edges of the top plate 1a parallel to each other. On the rear side of the inner surface of the upper half 1, there is set upright an inner rear wall section 15 for extending parallel to the rear edge of the top plate 1a. These inner sidewall sections 11, 12 and the rear inner wall section 15 are formed as one with the top plate 1a and are connected to each other so that the resulting assembly is substantially U-shaped with an open front surface. These inner sidewall sections 11, 12 and the inner rear wall section 15 are formed with a height substantially equal to the thickness of the disc cartridge 101 held in the casing 51. These inner sidewall sections 11, 12 and the inner rear wall section 15 are located towards the inner side with respect to the lateral and rear edges of the top plate 1a a distance corresponding to the thickness of each of the wall sections 11, 12 and 15.

On the outer lateral sides of the inner sidewall sections 11, 12, there are formed lateral engagement portions 13, 14 for extending outwards. These engagement portions 13, 14 are formed from the vicinity of the front ends of the inner sidewall sections 11, 12 towards the rear end thereof in parallel with both lateral edges of the top plate 1a. The lateral engagement portions 13, 14 are formed slightly above the lower ends of the inner sidewall sections 11, 12, that is towards the top plate 1a. On the outer sides of the inner rear wall section 15, there is formed a rear engagement portion 16 for extending outwards. The rear engagement portion 16 is protuberantly formed along the length of the inner rear wall section 15 in parallel with the rear edge of the top plate 1a. The rear engagement portion 16 is positioned slightly above the lower end of the inner rear wall section 15, that is towards the top plate 1a.

On the outer lateral sides of the inner sidewall sections 11, 12 are formed retention protrusions 24 for extending outwards. These retention protrusions 24 are provided at forward portions of the inner sidewall sections 11, 12 in proximity to the upper surfaces of the engagement portions 13, 14. The retention protrusions 24 are each of a protruding length slightly smaller than that of the lateral engagement portions 13, 14. The retention protrusions 24 are shaped so that the forward end faces thereof are perpendicular to the inner sidewall sections 11, 12 and are gradually decreased in protrusion amounts towards rear, as shown in FIG. 11. In rear portions of the outer lateral surfaces of the inner sidewall sections 11, 12 are formed vertically extending grooves 40. These vertically extending grooves 40 are extended from the proximal sides towards the distal sides of the inner sidewall sections 11, 12, that is from the inner surface of the top plate 1a towards the distal ends of the inner sidewall sections 11, 12.

The inner surface of the top plate 1a are formed steps on both lateral sides and on the rear side for being protruded from the inner surface. The purpose of providing these steps is to prevent the planar surface of the disc cartridge 101 from being in sliding contact with and thereby injured by the inner surface of the top plate 1a when introducing or detaching the disc cartridge 101 with respect to the casing 51.

An upper cut-out 5 is formed in the forward side of the top plate 1a. The purpose of providing the cut-out 5 is to expose the rear portion of the disc cartridge 101 housed within the casing 51 to be exposed to outside.

Figure 12:
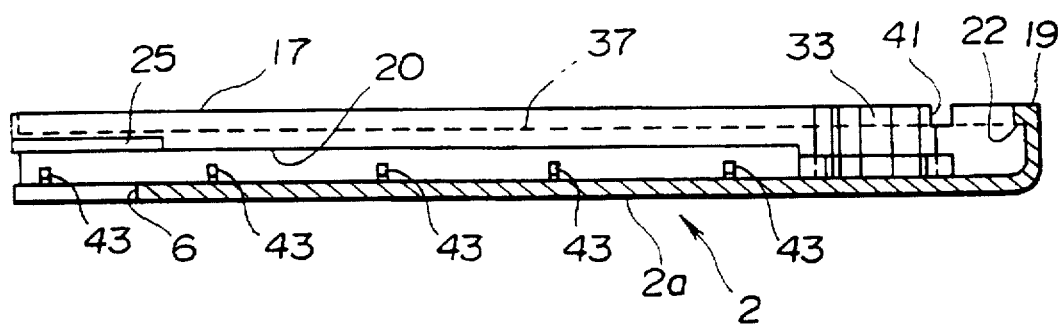
FIG. 12 is a side view showing a lower half of the casing.

The lower half 2, abutted against the upper half 1 for constituting the casing 51, has a bottom plate 2b having substantially the same rectangular profile as that of the top plate 1a of the upper half 1. On both lateral sides of the inner surface of the lower half 1 facing the upper half 1 are formed a pair of outer sidewall sections 17, 18 combined with the inner sidewall sections 11, 12 of the upper half 1 for constituting sidewall sections of the casing 51, as shown in FIGS. 10 and 12. These outer sidewall sections 17, 18 are formed along the lateral edges of the bottom plate 2a. At a rear portion on the inner surface of the lower half 2 is set upright an outer rear wall section 19 for extending along the rear edge of the bottom plate 2a. These outer sidewall sections 17, 18 and the outer rear wall section 19 are formed as one with the bottom plate 2a in continuation with one another so that the lower half 2 is formed in its entirety in a U-shaped cross-section with an open front side. These outer sidewall sections 17, 18 and the outer rear wall section 19 are of substantially the same height as the thickness of the disc cartridge 101 housed therein. In addition, these outer sidewall sections 17, 18 and the outer rear wall section 19 are formed at a distance from the lateral side edges and the rear edge of the bottom plate 2a corresponding to the thicknesses of the wall sections 17, 18 and 19, respectively.

In the inner lateral surfaces of the outer sidewall sections 17, 18 facing each other are formed lateral engagement grooves 20, 21. These lateral engagement grooves 20, 21 are formed for extending from near the front ends of the outer sidewall sections 17, 18 towards the rear ends thereof in parallel with the inner surface of the bottom plate 2a. These lateral engagement grooves 20, 21 are formed slightly above the proximal ends of the outer sidewall sections 17, 18, that is at a distance from the bottom surface 2a. On the inner surface of the outer sidewall section 19 is formed a flange 22 for defining a rear engagement groove. This groove 22 is formed along the upper edge of the outer sidewall section 19 in parallel with the inner surface of the bottom plate 2a. A rear engagement groove is defined by the flange 22 and the inner surface of the bottom plate 2a. In the inner surfaces of the outer sidewall sections 17, 18 are formed retention recesses 25, 26 for being opened towards the inner side. These retention recesses 25, 26 are formed at forward locations of the outer sidewall sections 17, 18, respectively, in association with the retention protrusions 24 formed on the upper half 1, for communication with the lateral engagement grooves 20, 21, respectively. These retention recesses 25, 26 are of a depth slightly shallower than the lateral engagement grooves 20, 21.

In the upper edges of the outer lateral sides of the outer sidewall sections 17, 18 are formed recesses 37, 38 for forming steps, as shown in FIGS. 10 and 12. Thee recesses 37, 38 are formed along the upper edges of the outer sidewall sections 17, 18 for extending from the front sides towards the rear sides of the outer sidewall sections 17, 18, respectively. That is, the recesses 37, 38 are shaped for opening the upper edges of the outer sidewall section 17, 18.

In the rear portions of the outer sidewall sections 17, 18 are formed a pair of cut-outs 41, 42 in association with the vertical grooves 40 formed in the upper half 1. These cut-outs 41, 42 are formed for extending from the upper ends towards the proximal sides of the outer sidewall sections 17, 18, respectively.

In the forward side of the bottom plate 2a is formed a lower cut-out 6. The purpose of providing this lower cut-out 6 is to cause the rear portions of the disc cartridge 101 held in the casing 51 to be exposed to outside.

In the inner surface of the bottom plate 2a are formed a pair of lateral steps 30, 31 and a rear step 32 for extending along both lateral sides and the rear side of the bottom plate 2a, respectively, as shown in FIG. 10. The purpose of providing these steps 30 to 32 is to prevent the planar major surface of the disc cartridge 101 from being in sliding contact with and thereby injured by the inner surface of the bottom plate 2a when inserting or detaching the disc cartridge 101 with respect to the casing 51. On the rear step 32 is formed a mistaken insertion inhibiting protrusion 29. This mistaken insertion inhibiting protrusion 29 is formed at a position slightly offset from the rear center position of the bottom plate 2a so as to be in register with a disc discrimination recess formed in the disc cartridge 101.

On both lateral ends of the flange 22 are provided a pair of rib-shaped reinforcements 27, 28 in continuation with the flange 22. These reinforcements 27, 28 are formed as one with the inner surface of the outer rear wall 19 for extending from the flange 22 towards the bottom plate 2a. In the lower portions of the lateral engagement grooves 20, 21 are formed plural reinforcement ribs 43 for extending from the lateral sides in the lateral engagement grooves 20, 21 towards the bottom plate 2a.

The upper half 1 and the lower half 2, thus constituted, are connected together to form the casing 51 by engaging the lateral engagement portions 14 of the upper half 1 in the lateral engagement grooves 20, 21 in the lower half 2 and by engaging the rear engagement portion 18 of the upper half 1 in a space between the flange 22 and the bottom plate 2a of the lower half 2, that is in the rear engagement groove. For connecting the upper half 1 and the lower half 2 to each other, it suffices to place the upper half 1 at a position ahead of the lower half 2, to introduce the rear ends of the lateral engagement portion 14 into the forward sides of the lateral engagement grooves 20, 21 and to move the upper half 1 towards rear for sliding the lateral engagement portions 14 in the lateral engagement grooves 20, 21, respectively. When the upper half 1 is slid to a position facing the bottom plate 2a, the rear engagement portion 16 of the upper half 1 is engaged with the rear engagement groove in the lower half 2, while the retention protrusions 16 are engaged with the retention recesses 25. For engaging the retention protrusions 24 with the retention recesses 25, 26, the retention protrusions 24 are inserted from the front sides of the outer sidewall section 17, 18 into a space between the outer sidewall sections 17, 18 for thrusting and slightly flexing the outer sidewall sections 17, 18 outwards. When the engagement protrusions 24 reach the positions of facing the retention recesses 25, the outer sidewall sections 17, 18 are elastically reset to the initial positions so as to be engaged in these retention recesses 25, 26.

The upper and lower halves 1 and 2 are connected at both lateral sides and at the rear sides of the top plate 1a and the bottom plate 2a so that the top plate 1a and the bottom plate 2a run parallel to each other, with the opening 52 for insertion and detachment of the disc cartridge 101 being defined on the forward side. This opening 52 has a width substantially corresponding to the length of the side of the disc cartridge 101 and a height substantially corresponding to the thickness of the disc cartridge 101. When the upper and lower halves 1 and 2 are connected together, the distal ends of the inner sidewall sections 11, 12 and the inner rear wall section 15 are abutted against the inner surface of the bottom plate 2a. The distal ends of the outer sidewall sections 17, 18 of the lower half 2 and the outer rear wall section 19 are abutted against the vicinity of the rim of the inner surface of the top plate 1a.

Figure 7:
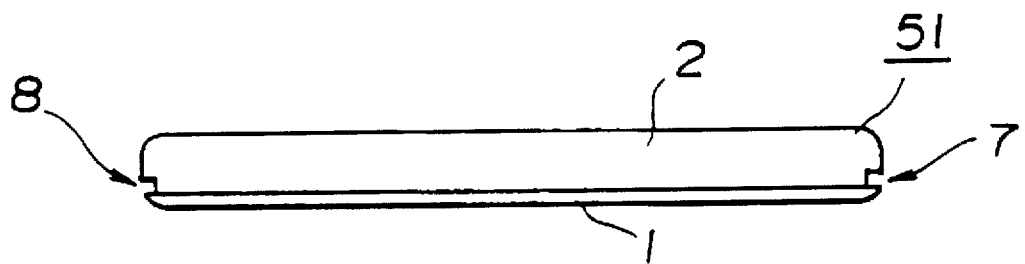
FIG. 7 is a back-side view of the casing.
Figure 8:
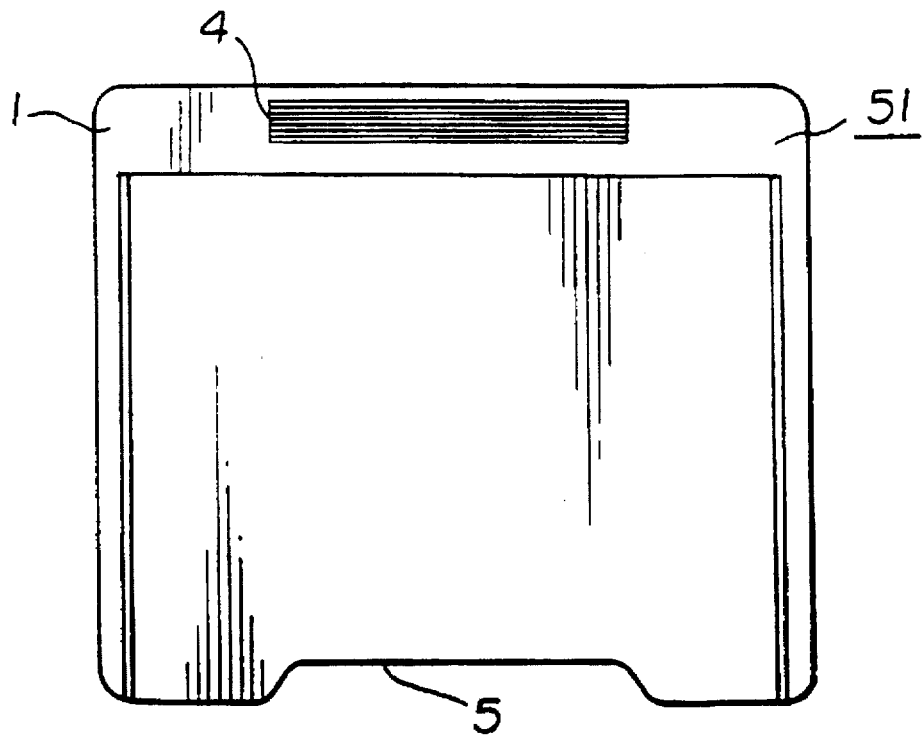
FIG. 8 is a bottom view of the casing.
Figure 9:
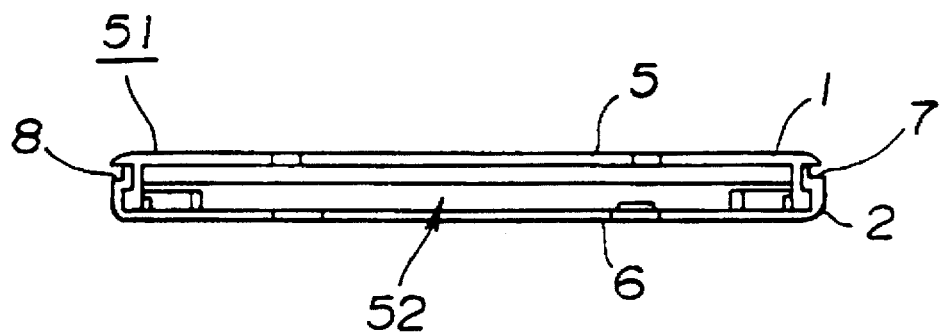
FIG. 9 is a front view of the casing.

By the recesses 37, 38 formed at the upper ends of the outer lateral sides of the outer sidewall sections 17, 18 of the lower half 2 and both lateral sides of the top plate 1a, lateral grooves 7, 8 are formed on both lateral sides of the casing 51, as shown in FIGS. 7 and 9. That is, the upper edges of the outer sidewall sections 17, 18 are abutted against the inner surface of the top plate 1a at the positions offset inwards with respect to the lateral edges of the top plate 1a a distance corresponding to the depth of the lateral grooves 7 and 8. These lateral grooves 7 and 8 are formed for extending from the front side having the opening 52 to the rear side f the casing 51 and engaged by support pieces provided on a rack adapted for holding plural casings 51 for supporting the casing 51 at a pre-set position.

The lateral grooves 7, 8 are formed along the inner surface of the top plate 1a, that is at a distance corresponding to the thickness of the top plate 1a from the upper surface of the casing 51. The lateral grooves 7, 8 are formed at a distance from the bottom plate 2a corresponding to the sum of the thickness of the bottom plate 2a and the portions of the outer sidewall sections 17, 18 lying below the recesses 37, 38. That is, the lateral grooves 7, 8 are formed at positions offset from the center of the lateral sides of the casing 51 constituted by the wall sections 17, 18, 11, 12 towards the top plate 1a.

Towards rear ends of the sidewall section 7, 8 are formed bottomed holes constituted by the cut-outs 41, 42 formed in the outer sidewall sections 17, 18 and the vertical grooves 40 formed in the inner sidewall sections 11, 12.

On the inner sides of the casing 51, that is between the upper and lower halves 1 and 2, a pair of lock members 9 and 10 for locking the disc cartridge 101 held within the casing 51 are provided, as shown in FIG. 10. These lock member 9, 10 are formed of elastic synthetic resin or metal in an arched form. These lock members 9, 10 are mounted by being engaged with a pair of lock member mounting portions 33, 34 formed on the lower half 2. The lock members 9, 10 are supported with the mid portions of the arch form convexed towards the inner side of the bottom plate 2a. The lock members 9, 10 may be elastically deformed in a direction of approaching the outer sidewall sections 17, 18.

The rear portions of the inner sidewall sections 11, 12 are removed, as shown in FIG. 11, so that the rear portions are shorter in distance from the top plate 1a than the mid and forward portions a length corresponding to the width of the lock members 9, 10. Specifically, the inner sidewall sections 11, 12 are adapted for not being abutted against the lock members 9, 10 held by the lock member holding portions 33, 34 of the lower half 2 and for preventing the lock members 9, 10 from being detached to above the lock member holding portions 33, 34.

The back sides of the lock member mounting portions 33, 34, that is the rear portions of the outer lateral surfaces of the outer sidewall sections 17, 18, are susceptible to sink during production of the lower half 2 by injection molding of synthetic resin. Such sink is produced under a situation that, since the portions of the outer sidewall sections 17, 18 provided with the lock member mounting portions 33, 34 are thicker in thickness than other portions of the outer sidewall sections 17, 18, so that these portions are recessed towards inside. For preventing such sink, the outer sidewall sections 17, 18 are formed with recesses in register with the lock member mounting portions 33, 34 of the outer sidewall sections 17, 18 for providing hollow portions for preventing sinks from occurring.

The casing 51, thus arranged, has both end corners chamfered arcuately.

For encasing the disc cartridge 101 in the casing 51, the disc cartridge 101 is introduced via the opening 52 into a space between the top plate 1a and the bottom plate 2a from a direction shown by arrow A in FIG. 5. When the disc cartridge 101 is inserted into the casing 51, only both lateral sides portions of the upper and lower planar surfaces of the disc cartridge 101 are in sliding contact with the steps 30, 31 formed in the casing 31, while the mid portions of the planar surface portions are not in sliding contact width the casing 51, so that there is no risk of injuries otherwise caused by repeated insertion and removal.

When the inserting end of the disc cartridge 101 reaches the rear end, that is the inner end, of the casing 51, the lock members 9, 10 are thrust by both sides of the inserting end of the cartridge main member 102, so that these lock members 9, 10 are elastically deformed in a direction of approaching the outer sidewall sections 17, 18. When the cartridge main member 102 is inserted to the extent that its inserting end is substantially abutted against the rear sidewall section 15 of the casing 51, the lock members 9, 19 face the recesses 110 on both lateral surfaces of the disc cartridge 101. At this time, the central arched portions of the lock members 9, 10 are elastically reset to the initial state into engagement in the recesses 110. With the lock members 9, 10 engaged in this manner in the recesses 110 of the disc cartridge 110 of the disc cartridge 101, the disc cartridge 101 is retained by being sandwitched by the lock members 9, 10 from both sides and prevented in this manner from being detached from the casing 51 through shock or vibrations. At this time, the mistaken insertion inhibiting protrusion 29 is engaged in the disc type discrimination recess formed in the disc cartridge 101.

For taking out the disc cartridge 101 held in the casing 51, the disc cartridge 101 facing partially to outside via upper and lower cut-outs 5, 6 is held with the finger end and pulled out. The lock members 9, 10 are thrust by both lateral sides of the disc cartridge 101 so as to be elastically deformed towards the outer sidewall sections 17, 18 for releasing the engagement of the disc cartridge 101 with the recesses 110. The disc cartridge 101 may now be taken out of the casing 51 via the opening 52. When the disc cartridge 101 is taken out of the casing 51, the lock members 9, 19 are reset to the initial state.

[2] Constitution of Main Card

The main card, used as an index card indicating a title, for example, showing the recording contents on the optical disc 117 housed within the disc cartridge 101 packaged in the overlap film along with the casing holding the disc cartridge 101 as described above, is now explained.

Figure 13:
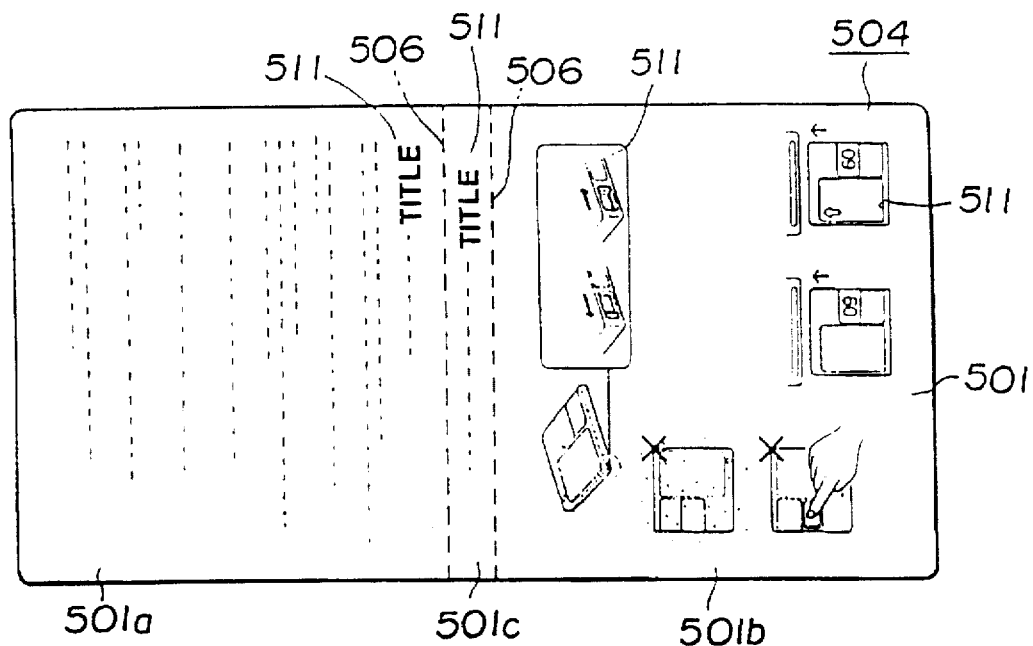
FIG. 13 is a plan view showing one of the surfaces of layered sheet comprised of a main card and a subsidiary card.
Figure 14:
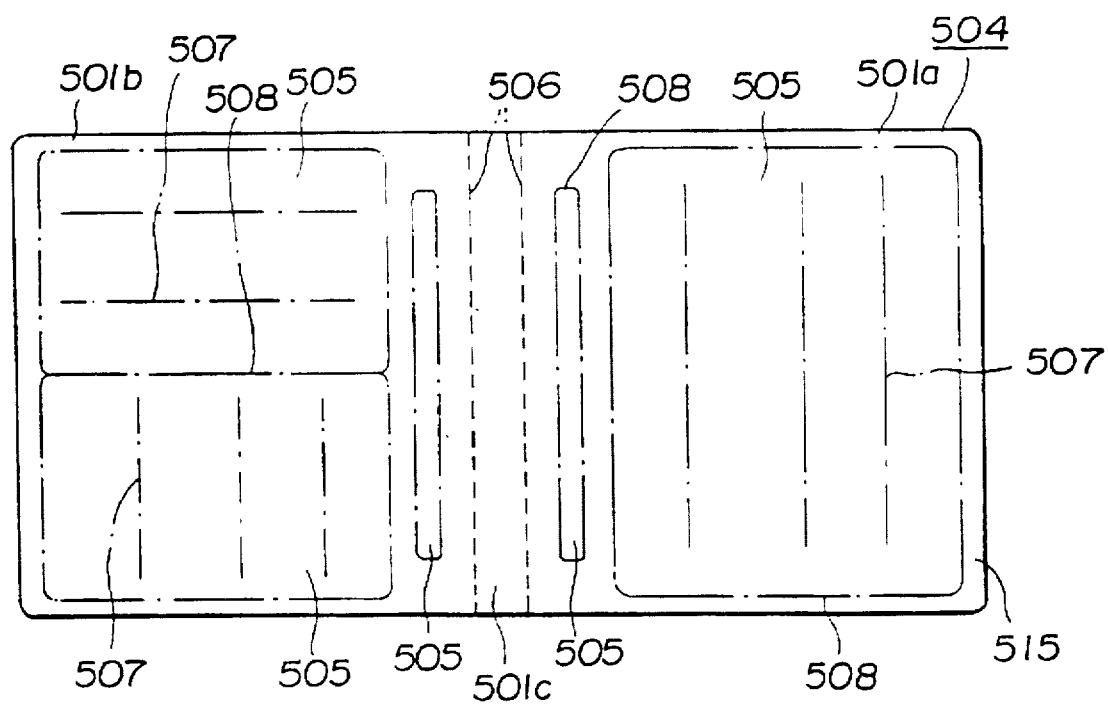
FIG. 14 is a bottom view showing the opposite surface of the layered sheet.

The main card 501 is comprised of a first card piece 501a overlying one of the major surfaces of the casing 51, a second card piece 501b overlying the other major surface of the casing 51 and a connecting piece 501c integrally interconnecting the first and second card pieces 501a, 501b, as shown in FIGS. 13 and 14. The connecting piece 501c has a width large enough to overlie the side of the casing 51 having the opening 52. The junction portions of the connecting portion 501c to the first and second card pieces 501a, 501b are provided with fold lines 506, 506 extending parallel to each other. The main card 501 is folded along the fold lines 506, 506 to a U-shaped cross-section and is fitted in the casing 51 via the side thereof having the opening 52.

The main card 501 is formed of a cardboard having strength high enough to resist deformation. Specifically, the main card is formed by a cardboard material having a basis weight on the order of 170 to 210 g/m.

On one of the surfaces of the main card 501 exposed to outside when the main card 501 is folded to a U-shaped cross-section along the fold lines 506, 506 for engagement with the outer peripheral surface of the casing 51, there is printed an indication 511 showing the title of music numbers, as the recording information of the optical disc 117 housed within the disc cartridge 101 held in the casing 51, design statements or types of the optical disc 117, or the manner of handling. Specifically, the indication 511 showing the title of the musical numbers recorded on the disc 117 or the manner of handling and the indication 511 showing the design statements or types of the optical disc 117 or the manner of handling are provided on the first piece 501a and on the second piece 501b of the main card 501, respectively. The indication showing part of the title is provided on the connecting piece 501c.

Figure 16:
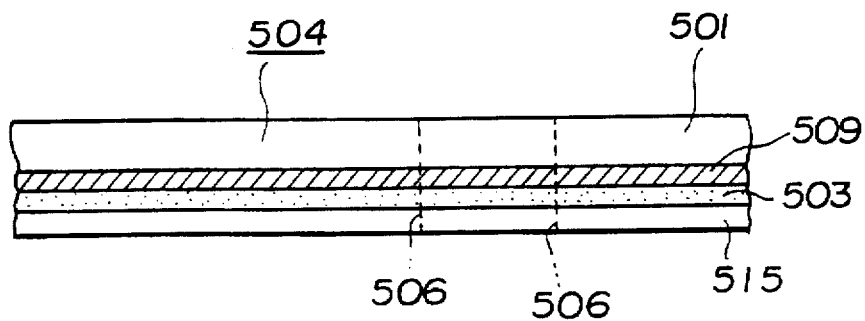
FIG. 16 is a cross-sectional view showing the layered sheet comprised of a main card and a subsidiary card.
Figure 17:
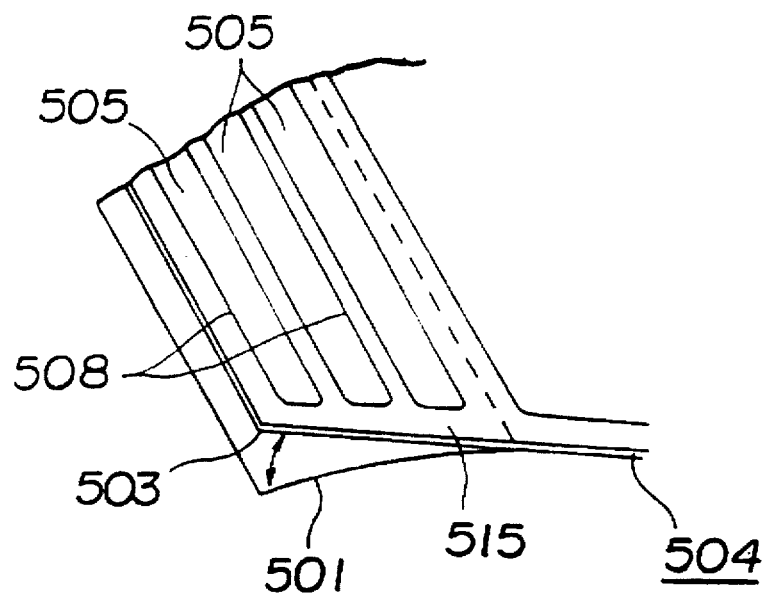
FIG. 17 is a perspective view showing the state of releasing the sheet for the subsidiary card from the main card.

On the surface of the main card 501 opposite to its surface provided with the indication 511, there is provided a column 507, made up of, for example, ruled lines, enabling the recording contents, the recording time or the like for the optical disc 117 housed within the disc cartridge 101, using a writing instrument, and a sheet for subsidiary labels 515, that can be stuck on the disc cartridge 101, is layered thereon, as shown in FIGS. 14 and 16. This sheet for subsidiary labels 515 has, on its surface to be layered on the main card 501, an adhesive layer 503 carrying an adhesive, and is layered via this adhesive layer 503 on the aforementioned opposite surface of the main card 501. On the surface of the main card 501 on which is layered the sheet for subsidiary label 515, there is provided a release layer 109 having a coating of a high molecular material, such as silicon. By providing the release layer 509, the sheet for subsidiary labels 515 can be released from the main card 501, when so desired, without leaving the adhesive layer 503 thereon, as shown in FIG. 17.

The sheet for subsidiary labels 515 is provided with weakened lines 508, such as perforations, so that the sheet may be severed by these weakened line 508. The portions of the sheet 515 surrounded by these weakened lines 508 and severed along these weakened lines 508 represent subsidiary labels or cards 505 that may be bonded to the disc cartridge 101.

The sheet for subsidiary labels 515, from which the subsidiary labels or cards 505 are severed, is formed by a paper material having a basis weight of 60 to 100 g/m. The paper material that makes up the sheet for subsidiary labels or cards is of a thickness such that, when the sheet 515 is layered on the main card 501 to give a layered assembly 504, the layered assembly 504 is not increased excessively in thickness to such an extent as to obstruct folding of the layered sheet along the folding lines 506, 506. The sheet for subsidiary labels 515 is formed of a paper material that permits satisfactory writing with the aid of writing instruments, such as water pen or ball-point pen.

[3] Packaging with Overlap Film

Figure 15:
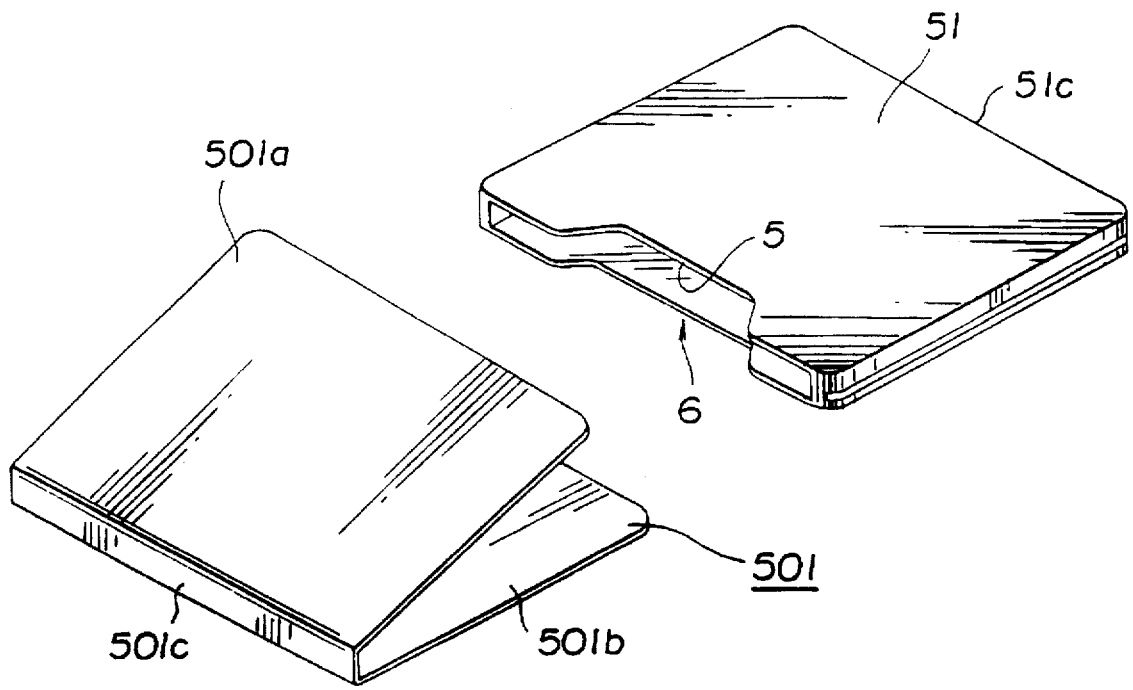
FIG. 15 is a perspective view showing the state of mounting of the layered sheet comprised of a main card and a subsidiary card.

With the disc cartridge 101 held within the casing 51, the main card 501, having the sheet for subsidiary label 515 layered thereon, is folded to a U-shaped cross-section along the fold lines 506, 506, and is placed over the outer peripheral surface of the casing 51 from the surface thereof having the opening 52, as shown in FIG. 15.

The casing 51, on the outer peripheral surface of which is placed the main card 501, is packaged along with the main card 51 by an overlap film 201 which is a film sheet formed of transparent synthetic resin. The overlap film 201 is a heat-contractible film sheet and is contracted on heating while being melted on further heating.

Figure 18:
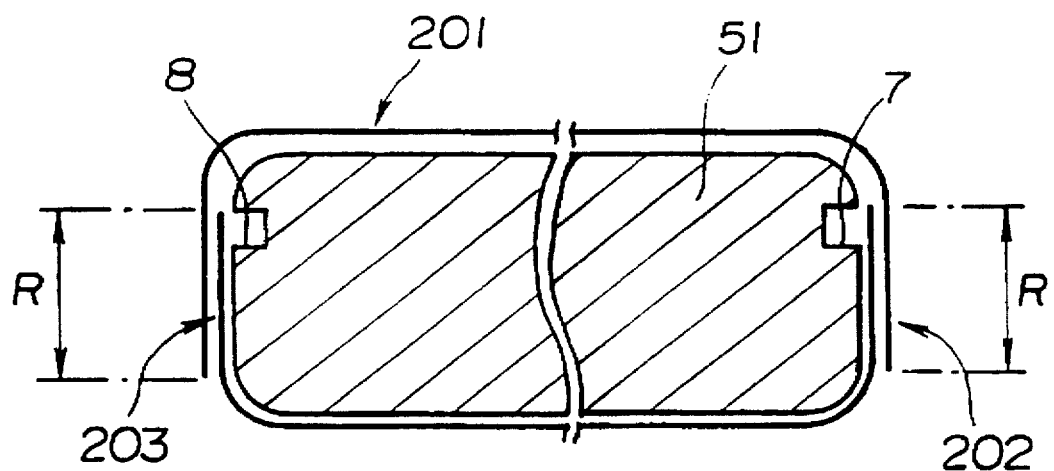
FIG. 18 is a longitudinal cross-sectional view showing the state of packaging the casing with an overlap film.
Figure 19:
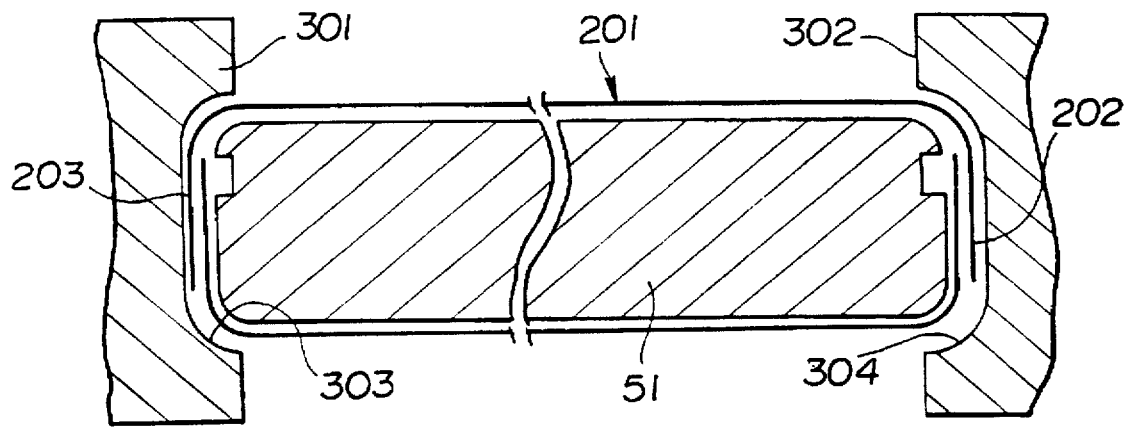
FIG. 19 is a longitudinal cross-sectional view showing the state of causing shrinkage of the overlap film having packaged the casing therein.

For packaging with the overlap film 201, the opposite lateral edges of the film are connected together to form a tubular film 201 within which the casing 51 having its outer peripheral surfaces sheathed with the main card 501 is introduced, as shown in FIGS. 18 and 19. Both ends of the tubular film 201 are bent inwards, as shown in FIGS. 18 and 19, to form superimposed portions 202, 203 which are then heated and fused together by a pair of heating irons 301, 302 of the heating kit. These superimposed portions 202, 203 are formed on the lateral sides of the casing 51.

The heating iron members 301, 302 are formed of metal and arranged facing each other. The heating iron members 301, 302 are heated by a heating mechanism, not shown, to a pre-set temperature and adjusted as to a distance relative to each other. The heating iron members 301, 302 are formed on the mutually facing lateral sides thereof with recesses 303, 304, as shown in FIG. 19. These recesses 303, 304 are contoured to conform to the shape of the lateral surfaces of the casing 51 so that both surfaces of the casing 51 are introduced up to the bottom surfaces of the recesses 303, 304. Since both sides of the casing 51 are rounded at corner portions thereof, the corner portions of the recesses 303, 304 are also rounded on contour. Since the recesses 303, 304 are contoured to conform intimately to both lateral sides of the casing 51, the end portions of the overlap film 201 possibly reaching the top plate 1a or the bottom plate 2a due to the overlap film 201 being shifted to one or the other sides may be heated and thermally fused by the heating iron members 301, 302.

Figure 20:
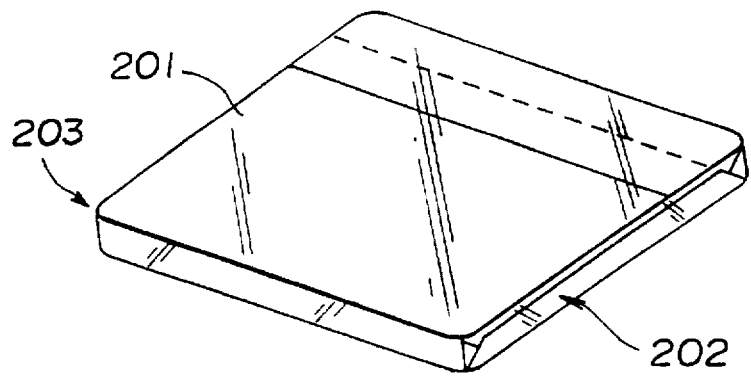
FIG. 20 is a perspective view showing the state of packaging the casing with the overlap film.
Figure 21:
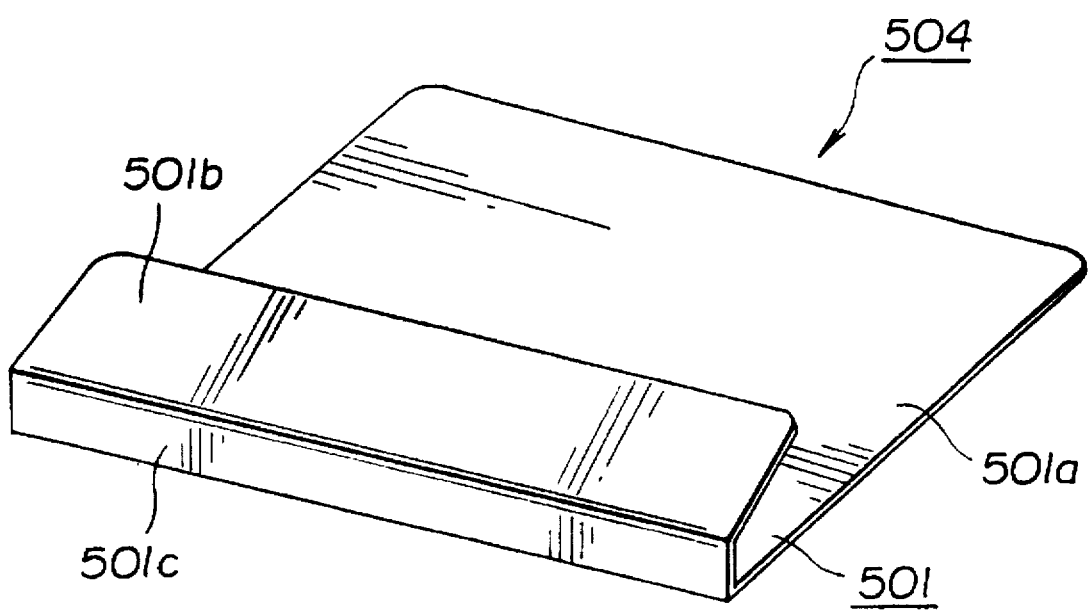
FIG. 21 is a perspective view showing a modification of a layered sheet comprised of a main card and a subsidiary card sheet.

By heating and thereby contracting the overlap film 201, for thereby intimately contacting the overlap film with the outer peripheral surface of the casing 51, packaging is completed, as shown in FIG. 20. Since the outer peripheral surface of the casing 51 is planarized by the main card 51, the overlap film 201 may be intimately contacted with the main card 501 sheathing the casing 51 without producing creased portions.

Since the main card 501 employed in the present embodiment is formed by a cardboard having a pre-set thickness, it is not liable to be deformed even if impact is applied thereto due to inadvertent descent of the casing 51. In particular, since the sheet for subsidiary labels or cards 515 is layered as one with the main card 501, the main card is improved further in strength and safeguarded against deformation thus assuring optimum packaged state for prolonged time. In addition, since the main card 501 and the sheet for subsidiary labels 515 are layered as one to each other, the indication 511 provided on the main card 501 such as the title indicating the recording contents on the optical disc 117 and the ruled lines provided on the sheet for subsidiary labels 515 for making up the entry column 507 may be printed by a series of printing steps thus facilitating production. Since the sheet for subsidiary labels 515 providing the subsidiary labels or cards is applied as one to the main card 501, there is no necessity of providing a release sheet for supporting the subsidiary cards 505 provided with the adhesive layer thus saving the material. Since the subsidiary cards not in use may be left on the main card 501, the subsidiary cards 505 may be facilitated in maintenance and prevented from being lost.

Although only one sheet for subsidiary labels 515 is layered on the main card 501, a further sheet for subsidiary labels 515 may also be provided on the sheet for subsidiary labels 515 provided on the main card 501.

The weakened lines 508 formed in the sheet for subsidiary labels 515 may be suitably changed in size and shape for providing the subsidiary cards or labels of desired size and shape.

Although the foregoing description of the present invention has been made in connection with packaging a casing encasing a disc cartridge in turn housing a disc-shaped recording medium, such as an optical disc, the same merits as those described above may be realized when the present invention is applied to packaging of the recording medium housed in a casing along with an index card stating the recording contents of the recording medium. Thus the present invention may be applied to packaging of a casing holding a tape cartridge housing in turn a tape-shaped recording medium, such as a magnetic tape.

I claim:

1. A packaging kit comprising:

a casing for housing a recording cartridge;

a layered assembly including:

a main card, formed of a first paper material having a weight of 170 to 210 g/m$^2$, said main card sheathing an external surface of said casing and having a first surface on which indicia are displayed;

a subsidiary card, formed of a second paper material and having a weight of 60 to 100 g/m², said subsidiary card being bonded via an adhesive layer to a second surface of the main card in a manner which permits manual releasing of said subsidiary card from said main card;

said layered assembly having portions which are not directly supported by contact with the casing, and wherein the weights of the first and second paper materials impart sufficient strength to the portions which are not directly supported by direct contact with the casing to obviate impact induced warpage thereof, and to maintain an aesthetic value of the packaging kit; and a packaging film overlying the outer surface of said layered assembly.

2. In a packaging kit comprising:

a casing holding a cartridge which encloses a recording medium; and a layered assembly composed of:

a main card sheathing said casing and having indicia formed on a first surface thereof, and a sheet for subsidiary labels releasably adhered via an adhesive layer to a second surface of the main card opposite to the first surface said layered assembly being bent so as to overlie the surfaces of the casing, a transparent film sheet overlying the layered assembly and the casing, said film sheet being heat-contracted so as to intimately contact said layered assembly, wherein the improvement comprises said main card being formed of paper material which has a weight of 170 to 219 g/m², and said sheet being formed of a paper material having a weight of 60 to 100 g/m², whereby the layered assembly exhibits a strength wherein the portions of the layered assembly, which are not directly supported by contact with the casing are resistant to impact induced warpage in a manner which maintains the aesthetic value of the packaging kit.

* * * * *